United States Patent
Wotzak (10) Patent No.: US 9,869,198 B2
(45) Date of Patent: Jan. 16, 2018

(54) INTERSHAFT INTEGRATED SEAL AND LOCK-NUT

(71) Applicant: General Electric Company, Schenectady, NY (US)

(72) Inventor: Mark Gregory Wotzak, Chestnut Hill, MA (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 14/710,742

(22) Filed: May 13, 2015

(65) Prior Publication Data

US 2016/0333722 A1 Nov. 17, 2016

(51) Int. Cl.
*F01D 15/12* (2006.01)
*F01D 5/02* (2006.01)
(Continued)

(52) U.S. Cl.
CPC ............. *F01D 15/12* (2013.01); *F01D 5/02* (2013.01); *F01D 5/026* (2013.01); *F01D 11/003* (2013.01);
(Continued)

(58) Field of Classification Search
CPC . F01D 15/12; F01D 5/02; F01D 5/026; F01D 11/003; F01D 25/16; F16B 39/28; F05D 2240/54; F05D 2240/55; F05D 2240/60; F05D 2260/31
See application file for complete search history.

(56) References Cited

U.S. PATENT DOCUMENTS 3,402,750 A * 9/1968 Wilkinson .............. F01D 5/026
411/272
4,754,984 A 7/1988 Keba
(Continued)

FOREIGN PATENT DOCUMENTS

DE 102009054007 A1 5/2011
EP 0277906 A2 10/1988
(Continued)

OTHER PUBLICATIONS

A European Search Report and Opinion issued in connection with corresponding EP Application No. 16168852.8 dated Oct. 7, 2016.

*Primary Examiner* — Dwayne J White
*Assistant Examiner* — Peter T Hrubiec
(74) *Attorney, Agent, or Firm* — General Electric Company; William Scott Andes (57) ABSTRACT

An intershaft integrated seal and lock-nut assembly includes spaced apart forward and aft shafts, forward lock-nut threaded onto aft end of forward shaft, aft lock-nut threaded onto a forward end of aft shaft, and seal ring sealingly engaging and disposed between forward and aft lock-nuts operable to seal annular gap between forward and aft shafts. Seal ring may be disposed in annular ring groove extending radially inwardly into one of forward and aft lock-nuts and annular cylindrical inner surface on other one of lock-nuts operable to seal against seal ring. Seal ring may be carbon seal ring and split. Aft lock-nut may include forwardly extending annular arm having annular cylindrical inner surface. Retention tabbed rings may engage lock-nuts and shafts and snap rings may engage retention tabbed rings and lock-nuts. Seal ring may be in ring groove in aft lock-nut.

19 Claims, 7 Drawing Sheets

(51) Int. Cl.
  *F01D 11/00* (2006.01)
  *F16B 39/28* (2006.01)
  *F01D 25/16* (2006.01)

(52) U.S. Cl.
  CPC .............. *F01D 25/16* (2013.01); *F16B 39/28* (2013.01); *F05D 2220/32* (2013.01); *F05D 2240/24* (2013.01); *F05D 2240/54* (2013.01); *F05D 2240/55* (2013.01); *F05D 2240/60* (2013.01); *F05D 2260/31* (2013.01); *F05D 2260/40311* (2013.01)

(56) References Cited

U.S. PATENT DOCUMENTS

| | | |
|---|---|---|
| 5,201,844 A | 4/1993 | Greenwood et al. |
| 5,537,814 A | 7/1996 | Nastuk et al. |
| 6,196,790 B1 | 3/2001 | Sheridan et al. |
| 8,100,403 B2 | 1/2012 | Short |
| 8,100,666 B2 | 1/2012 | Makuszewski |
| 8,205,891 B2 | 6/2012 | Vasagar |
| 8,408,555 B2 | 4/2013 | Garrison |
| 2012/0261887 A1 | 10/2012 | Vasagar |
| 2013/0034438 A1 | 2/2013 | Jahn |
| 2014/0049010 A1 | 2/2014 | Jahn et al. |
| 2014/0091535 A1 | 4/2014 | Cusack et al. |

FOREIGN PATENT DOCUMENTS

| | | |
|---|---|---|
| EP | 1396608 A2 | 10/2004 |
| GB | 599045 A | 3/1948 |

\* cited by examiner

INTERSHAFT INTEGRATED SEAL AND LOCK-NUT

BACKGROUND OF THE INVENTION

Technical Field

The present invention relates generally to intershaft seals and, more specifically, for such shafts with lock-nuts.

Background Information

Air or oil sealing is often required between two opposing shafts such as is found in gas turbine engines. Sometimes, there is very little axial room in the available space to package and locate radial intershaft seals such as labyrinth seals. Often, one or both of these opposing shafts have lock-nuts that are used at ends of the shafts to hold components such as gears, bearings, and seal runners together on the shafts.

Thus, there continues to be a need for air and oil intershaft seals which provide lighter weight seal assemblies that occupy smaller volumes with less leakage than labyrinth seals and other conventional seals. It is desirable to provide intershaft sealing in a tight design space that would otherwise require a less desirable seal such as a labyrinth seal between concentric shafts.

BRIEF DESCRIPTION OF THE INVENTION

An intershaft integrated seal and lock-nut assembly includes axially spaced apart forward and aft shafts, a forward lock-nut threaded onto an aft end of the forward shaft, an aft lock-nut threaded onto a forward end of the aft shaft, and a seal ring sealingly engaging and disposed between the forward and aft lock-nuts and operable to seal an annular gap between forward and aft shafts.

The assembly may further include the seal ring disposed in an annular ring groove extending radially inwardly into one of the forward and aft lock-nuts, an annular cylindrical inner surface on another one of the forward and aft lock-nuts, and the annular cylindrical inner surface operable to seal against the seal ring. The seal ring may be a carbon seal ring and may be split.

The aft lock-nut may include a forwardly extending annular arm having the annular cylindrical inner surface surrounding the annular ring groove.

One embodiment of the assembly may include forward and aft retention tabbed rings engaging the forward and aft lock-nuts and the forward and aft shafts respectively, forward and aft snap rings disposed in radially inwardly open annular forward and aft grooves in the lock-nuts respectively, and the forward and aft snap rings engaging the forward and aft retention tabbed rings and the forward and aft lock-nuts respectively.

A gas turbine engine assembly includes axially spaced apart power output and stub shafts, the power output shaft connected to a low pressure drive shaft connected to a low pressure turbine, the stub shaft connected to a high pressure rotor including a high pressure turbine and rotatably supported by a first bearing, a horizontal bevel gear and a ball bearing inner race of the first bearing mounted on the stub shaft, a high pressure lock-nut threaded on forward threads on a forward end of the stub shaft, the high pressure lock-nut axially securing the horizontal bevel gear and the ball bearing inner race on the stub shaft, an aft power shaft lock-nut threaded on aft threads on an aft end of the power output shaft axially securing the low pressure drive shaft and a roller bearing inner race of the output shaft bearing to the power output shaft, and a seal ring sealingly engaging and disposed between the aft power shaft lock-nut and the high pressure lock-nut and operable to seal an annular gap between the power output shaft and the stub shaft.

The seal ring may be disposed in the annular ring groove extending radially inwardly into the aft lock-nut with the forward lock-nut including an aftwardly extending annular arm having an annular cylindrical inner surface surrounding the annular ring groove, and the annular cylindrical inner surface may be operable to seal against the seal ring.

DETAILED DESCRIPTION OF THE INVENTION

Figure 1:
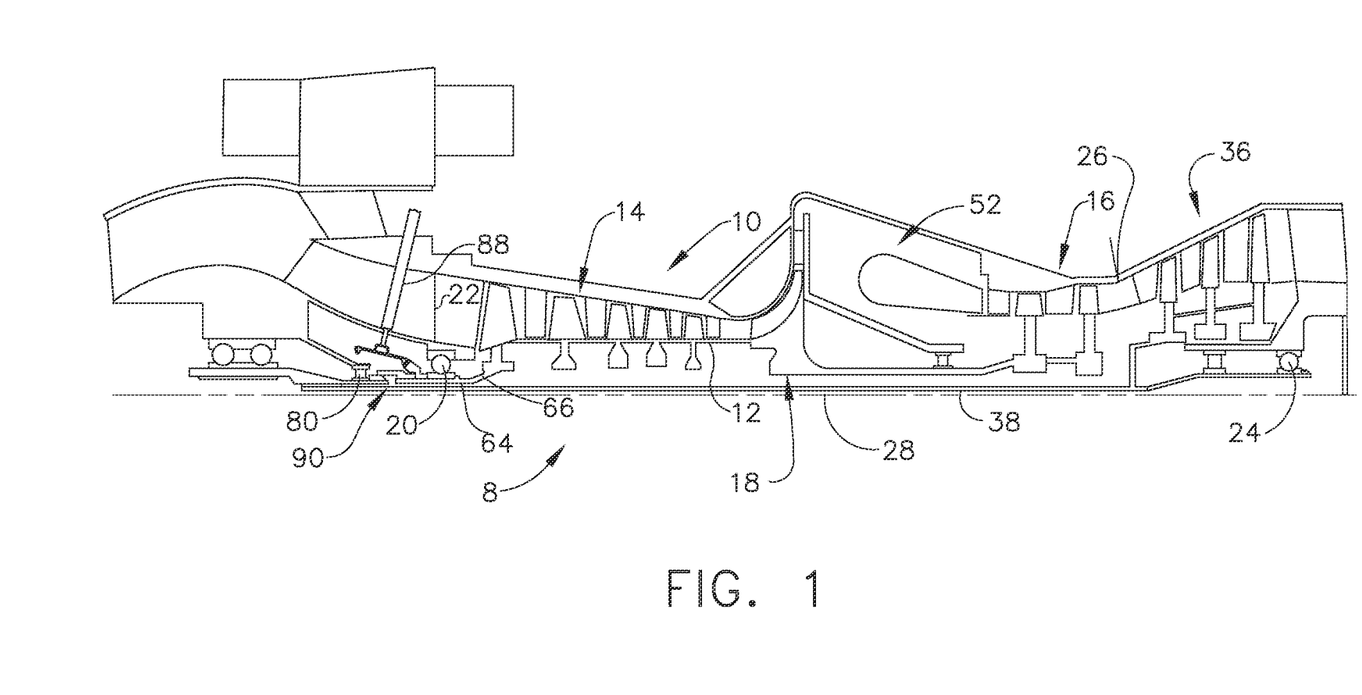
FIG. 1 is a sectional view illustration of a gas turbine engine having an intershaft integrated seal and lock-nut.

Illustrated in FIG. 1, gas turbine engine assembly 8 with a high pressure gas generator 10 having a single stage centrifugal compressor 18 as a final compressor stage. The high pressure gas generator 10 has a high pressure rotor 12 including, in downstream flow relationship, a high pressure compressor 14, a combustor 52, and a high pressure turbine 16. The rotor 12 is rotatably supported about an engine centerline 28 by a first or forward bearing 20 in a front frame 22 and a rear bearing 24 disposed downstream of the high pressure turbine 16 in a turbine frame 26.

Figure 2:
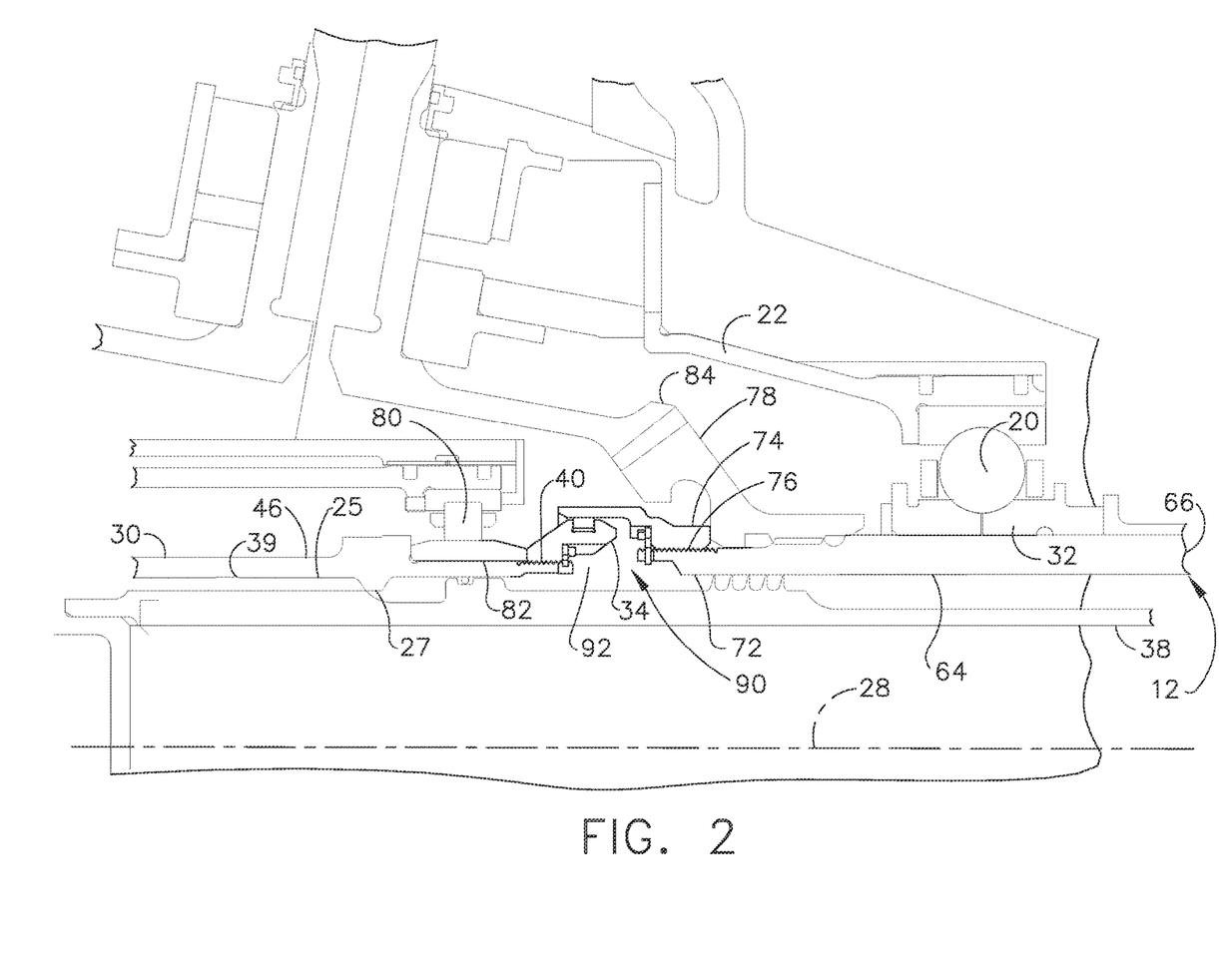
FIG. 2 is an enlarged sectional view illustration of the intershaft integrated seal and lock-nut illustrated in FIG. 1.

Referring further to FIG. 2, a stub shaft 64 is located at a front end 66 of the high pressure rotor 12 to which it is connected. A high pressure lock-nut 74 is threaded on forward threads 76 on a forward end 72 of the stub shaft 64. The high pressure lock-nut 74 is used to tighten, secure, and clamp together and place in compression a horizontal bevel gear 78 and a ball bearing inner race 32 of the forward bearing 20 rotatably supporting the stub shaft 64. The horizontal bevel gear 78 drivingly engages a power take-off bevel gear 84 fixedly attached to a power take-off shaft 88.

Referring to FIGS. 1 and 2, a low pressure turbine (LPT) 36 downstream of the high pressure turbine 16 is joined by a low pressure drive shaft 38 to a power output shaft 30 rotatably supported by an output shaft bearing 80. The low pressure drive shaft 38 is located radially within and joined to the power output shaft 30 by a splined joint 39. The splined joint 39 includes mating inner and outer splines 25, 27 extending radially outwardly and inwardly from the low pressure drive shaft 38 and the power output shaft 30 respectively. The splined joint 39 connects the low pressure drive shaft 38 to an aft end 46 of the power output shaft 30.

An aft power shaft lock-nut 34 threaded on aft threads 40 on the aft end 46 of the power output shaft 30 is used to tighten, secure, and clamp together the power output shaft 30 and a roller bearing inner race 82 of the output shaft bearing 80.

An intershaft integrated seal and lock-nut assembly 90 provides an air and/or oil seal between two shafts illustrated herein as the power output shaft 30 and the stub shaft 64. The intershaft integrated seal and lock-nut assembly 90 may also be used with other types of shafts in other applications and machinery. The high pressure lock-nut 74 is spaced axially apart from and downstream or aft of the aft power shaft lock-nut 34. The stub shaft 64 radially surrounds and is concentric with the power output shaft 30. The stub shaft 64 is spaced axially apart from and downstream or aft of the power output shaft 30. An intershaft annular gap 92 extends axially between the stub shaft 64 and the power output shaft 30.

Figure 3:
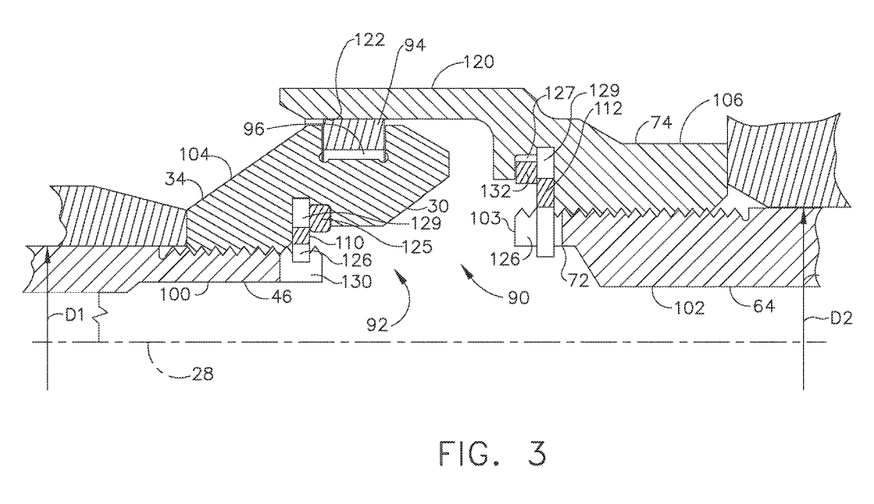
FIG. 3 is a diagrammatical view illustration of the intershaft integrated seal and lock-nut through 3-3 in FIGS. 4 and 5.

Referring to FIGS. 2 and 3, the intershaft integrated seal and lock-nut assembly 90 provides sealing across the intershaft annular gap 92. The intershaft integrated seal and lock-nut assembly 90 may be used to provide sealing across the annular gap 92 between a great many types of axially spaced apart forward and aft shafts 100, 102 as illustrated in FIG. 3. The aft power shaft lock-nut 34 and the high pressure lock-nut 74 may be referred to as forward and aft lock-nuts 104, 106 and are mounted on the forward and aft shafts 100, 102. The intershaft integrated seal and lock-nut assembly 90 includes a seal ring 94 disposed in an annular ring groove 96 extending radially inwardly into the forward lock-nut 104. The seal ring 94 is operable to seal against the forward lock-nut 104 within the annular ring groove 96. The seal ring 94 may be a carbon ring and may be split.

Referring to FIGS. 2 and 3, a forwardly extending annular arm 120 of the aft lock-nut 106 has an annular cylindrical inner surface 122 surrounding the annular ring groove 96 and is operable to seal against the seal ring 94. The annular arm 120, the annular inner surface 122, the seal ring 94, the forward lock-nut 104, and the forward shaft 100, are all concentric about a centerline 28. The aft lock-nut 106 and the aft shaft 102 are concentric about the centerline 28. The design flexibility afforded by the intershaft integrated seal and lock-nut assembly 90 permits the use of different diameters of the forward and aft shafts 100, 102 as indicated by a larger aft diameter D2 of the aft shaft 102 as compared to a front diameter D1 of the aft shaft 102.

Figure 3A:
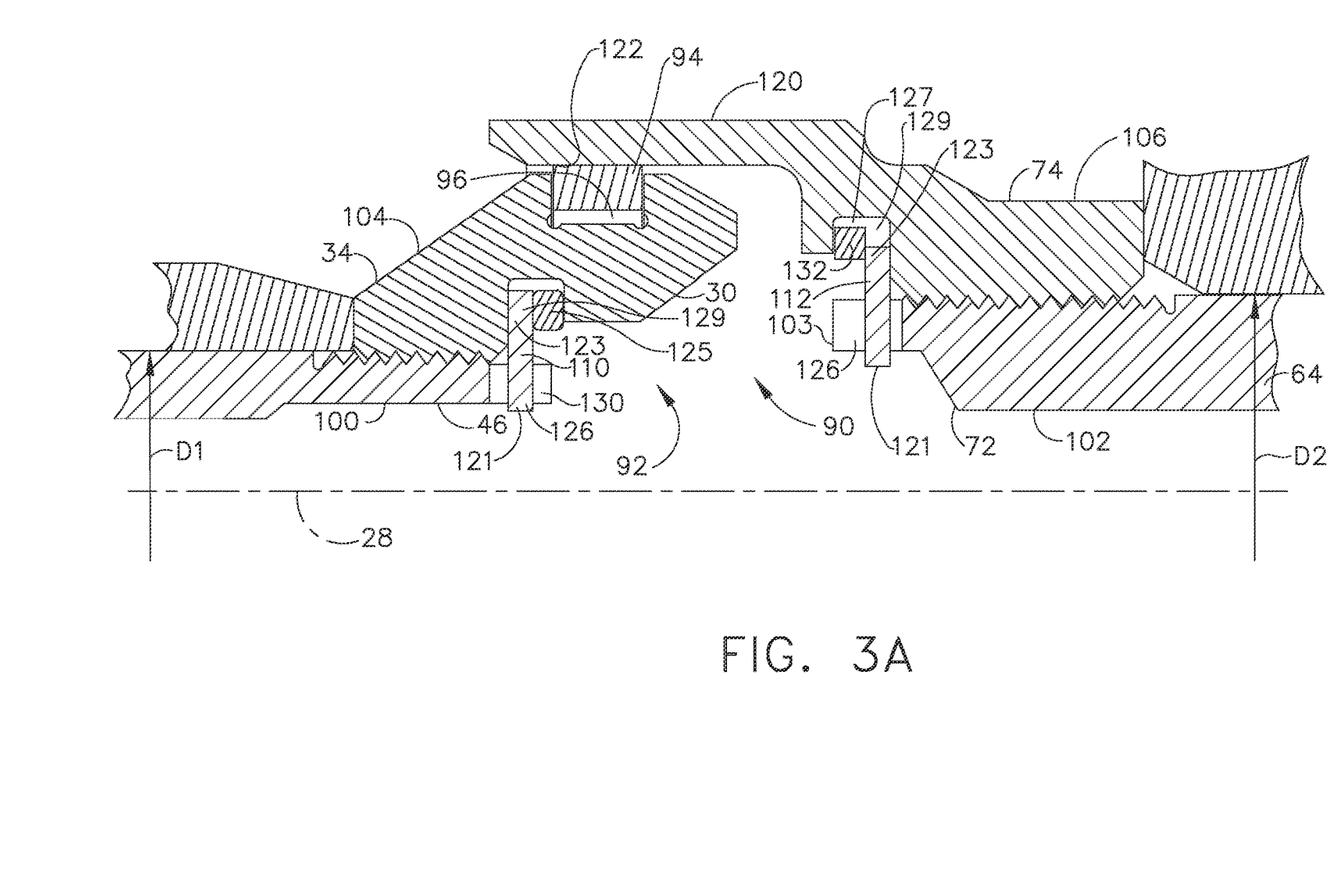
FIG. 3A is a diagrammatical view illustration of the intershaft integrated seal and lock-nut through 3A-3A in FIGS. 4 and 5.
Figure 4:
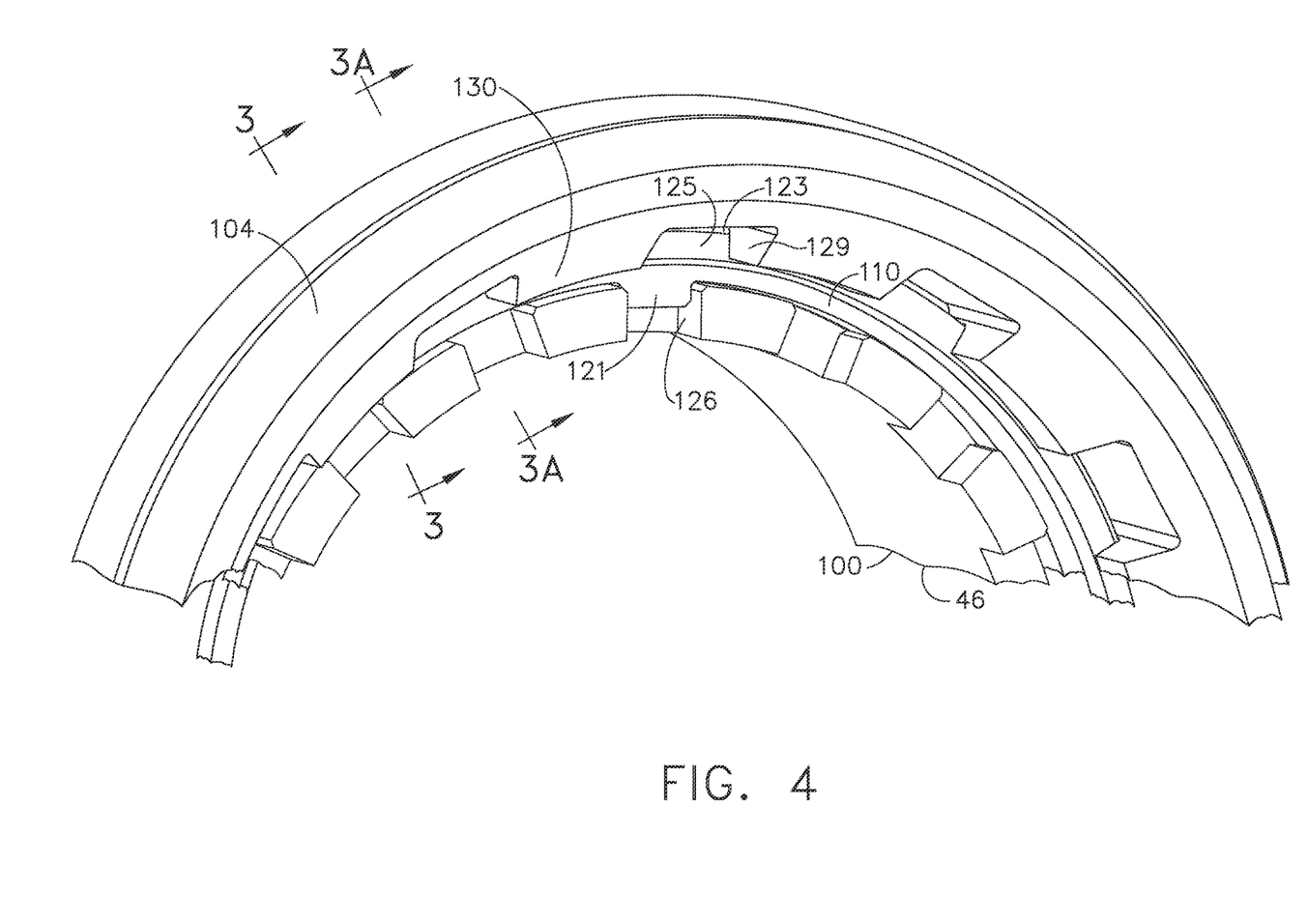
FIG. 4 is a perspective view diagrammatical illustration of the lock-nut and retention ring on a forward shaft of the intershaft integrated seal and lock-nut illustrated in FIG. 3.

Referring to FIGS. 3, 3A, and 4, the forward lock-nut 104 is threaded onto the aft end 46 of the forward shaft 100 and is secured in place and prevented from rotating by a forward retention tabbed ring 110 engaging the forward lock-nut 104 and the forward shaft 100. The forward retention tabbed ring 110 is substantially disposed between the forward lock-nut 104 and the aft end 46 of the forward shaft 100. The forward retention tabbed ring 110 includes one or more radially inwardly and outwardly protruding tabs 121, 123 extending into corresponding inner and outer slots 126, 129 through aft ends 130 of the forward shaft 100 and the forward lock-nut 104 respectively. The forward retention tabbed ring 110 is axially retained by a forward snap ring 125 disposed in a radially inwardly open annular forward groove 124 in the forward lock-nut 104 and engaging both the forward retention tabbed ring 110 and the forward lock-nut 104.

Figure 5:
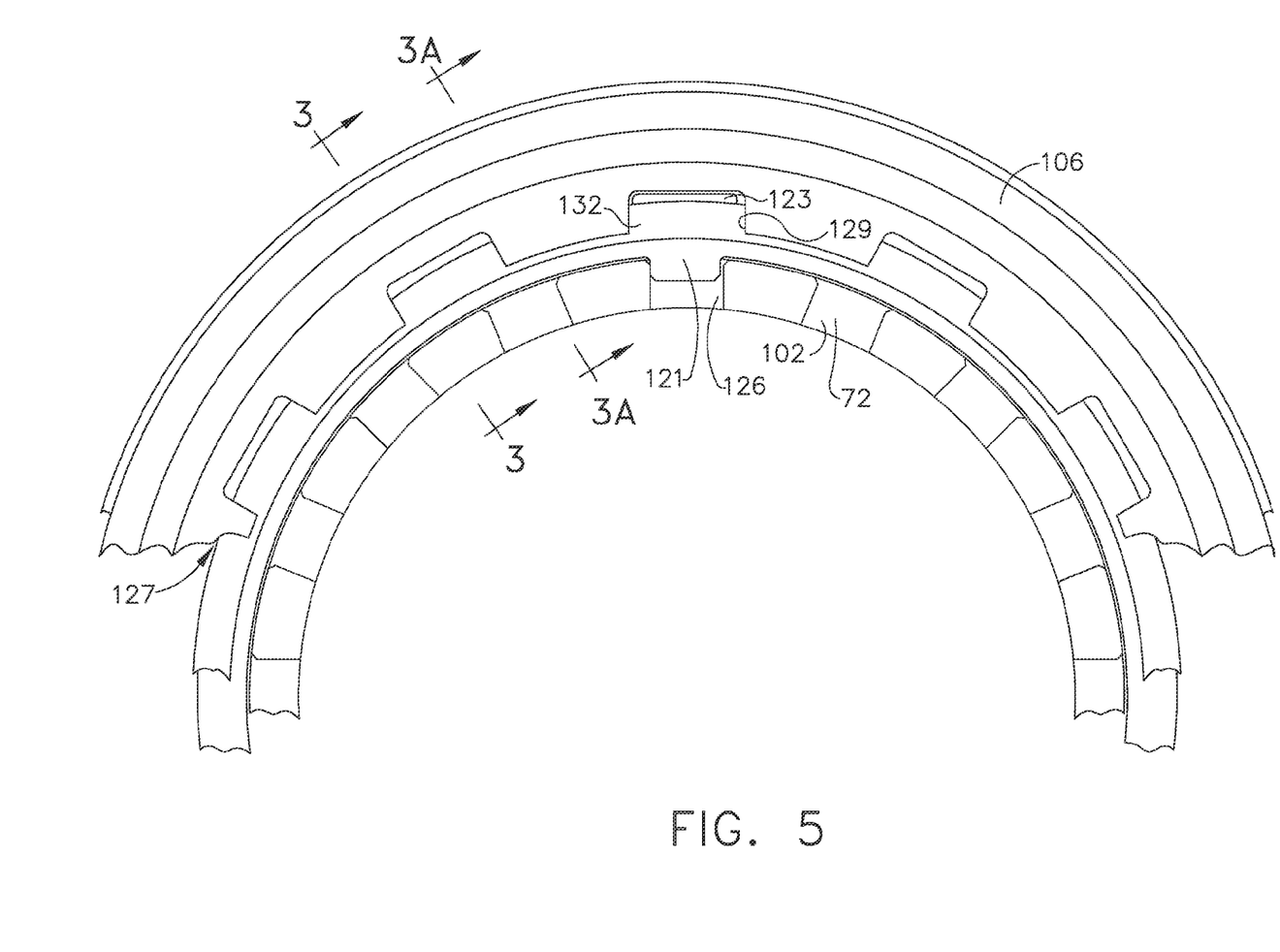
FIG. 5 is a perspective view diagrammatical illustration of the lock-nut and retention ring on an aft shaft of the intershaft integrated seal and lock-nut illustrated in FIG. 3.

Referring to FIGS. 3, 3A, and 5, the aft lock-nut 106 is threaded onto the forward end 72 of the aft shaft 102 and secured in place and prevented from rotating by an aft retention tabbed ring 112 engaging the aft lock-nut 106 and the aft shaft 102. The aft retention tabbed ring 112 is substantially disposed between the aft lock-nut 106 and the aft shaft 102. The aft retention tabbed ring 112 includes one or more radially inwardly and outwardly protruding tabs 121, 123 extending into corresponding inner and outer slots 126, 129 through forward ends 103 of the aft shaft 102 and the aft lock-nut 106 respectively. The aft retention tabbed ring 112 is axially retained by an aft snap ring 132 disposed in a radially inwardly open annular aft groove 127 in the aft lock-nut 106 and engaging both the aft retention tabbed ring 112 and the aft lock-nut 106. FIGS. 4 and 5 illustrate one exemplary design to secure the forward and aft lock-nuts 104, 106 to the forward and aft shafts 100, 102 illustrated in FIG. 3.

Figure 6:
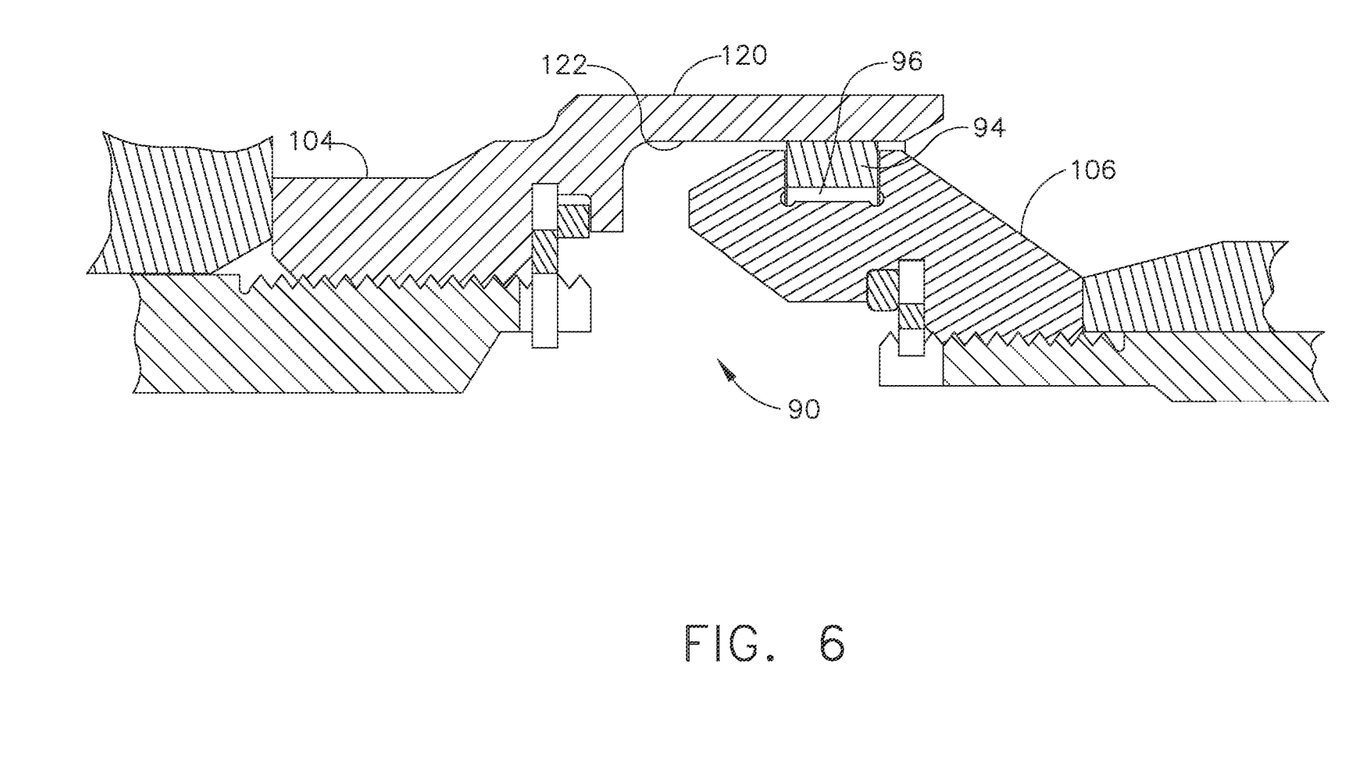
FIG. 6 is a diagrammatical view illustration of an alternative intershaft integrated seal and lock-nut with the seal ring disposed in an annular ring groove extending into the aft lock-nut.

Illustrated in FIG. 6 is one alternative embodiment of the intershaft integrated seal and lock-nut assembly 90 which includes the seal ring 94 disposed in an annular ring groove 96 extending radially inwardly into the aft lock-nut 106. The seal ring 94 is operable to seal against the aft lock-nut 106 within the annular ring groove 96. An aftwardly extending annular arm 120 of the forward lock-nut 104 has an annular cylindrical inner surface 122 surrounding the annular ring groove 96 and is operable to seal against the seal ring 94.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. An intershaft integrated seal and lock-nut assembly comprising:
   axially spaced apart forward and aft shafts,
   a forward lock-nut threaded onto an aft end of the forward shaft,
   an aft lock-nut threaded onto a forward end of the aft shaft, and
   a seal ring sealingly engaging and disposed between the forward and aft lock-nuts and operable to seal an annular gap between forward and aft shafts, further comprising:
   the seal ring disposed in an annular ring groove extending radially inwardly into one of the forward and aft lock-nuts,
   the seal ring operable to seal against the one of the forward and aft lock-nuts within the annular ring groove,
   an annular cylindrical inner surface on another one of the forward and aft lock-nuts, and
   the annular cylindrical inner surface operable to seal against the seal ring.

2. The assembly as claimed in claim 1, further comprising the seal ring being a carbon seal ring.

3. The assembly as claimed in claim 2, further comprising the carbon seal ring being split.

4. An intershaft integrated seal and lock-nut assembly comprising:
   axially spaced apart forward and aft shafts,
   a forward lock-nut threaded onto an aft end of the forward shaft,
   an aft lock-nut threaded onto a forward end of the aft shaft, and a seal ring sealingly engaging and disposed between the forward and aft lock-nuts and operable to seal an annular gap between forward and aft shafts, further comprising:
the seal ring disposed in the annular ring groove extending radially inwardly into the forward lock-nut,
the aft lock-nut including a forwardly extending annular arm having an annular cylindrical inner surface surrounding the annular ring groove, and
the annular cylindrical inner surface being operable to seal against the seal ring.

5. The assembly as claimed in claim 4, further comprising the seal ring being a carbon seal ring.

6. The assembly as claimed in claim 5, further comprising the carbon seal ring being split.

7. An intershaft integrated seal and lock-nut assembly comprising:
axially spaced apart forward and aft shafts,
a forward lock-nut threaded onto an aft end of the forward shaft,
an aft lock-nut threaded onto a forward end of the aft shaft, and
a seal ring sealingly engaging and disposed between the forward and aft lock-nuts and operable to seal an annular gap between forward and aft shafts, further comprising:
forward and aft retention tabbed rings engaging the forward and aft lock-nuts and the forward and aft shafts respectively,
forward and aft snap rings disposed in radially inwardly open annular forward and aft grooves in the lock-nuts respectively, and
the forward and aft snap rings engaging the forward and aft retention tabbed rings and the forward and aft lock-nuts respectively.

8. The assembly as claimed in claim 7, further comprising:
the seal ring disposed in the annular ring groove extending radially inwardly into the forward lock-nut,
the aft lock-nut including a forwardly extending annular arm having an annular cylindrical inner surface surrounding the annular ring groove, and
the annular cylindrical inner surface being operable to seal against the seal ring.

9. The assembly as claimed in claim 8, further comprising the seal ring being a carbon seal ring and/or split.

10. An intershaft integrated seal and lock-nut assembly comprising:
axially spaced apart forward and aft shafts,
a forward lock-nut threaded onto an aft end of the forward shaft,
an aft lock-nut threaded onto a forward end of the aft shaft, and
a seal ring sealingly engaging and disposed between the forward and aft lock-nuts and operable to seal an annular gap between forward and aft shafts, further comprising:
the seal ring disposed in the annular ring groove extending radially inwardly into the aft lock-nut,
the forward lock-nut including an aftwardly extending annular arm having an annular cylindrical inner surface surrounding the annular ring groove, and
the annular cylindrical inner surface operable to seal against the seal ring.

11. A gas turbine engine assembly comprising:
axially spaced apart power output and stub shafts,
the power output connected to a low pressure drive shaft connected to a low pressure turbine,
the stub shaft connected to a high pressure rotor including a high pressure turbine and rotatably supported by a first bearing,
a horizontal bevel gear and a ball bearing inner race of the a first bearing mounted on the stub shaft,
a high pressure lock-nut threaded on forward threads on a forward end of the stub shaft,
the high pressure lock-nut axially securing the horizontal bevel gear and the ball bearing inner race on the stub shaft,
an aft power shaft lock-nut threaded on aft threads on an aft end of the power output shaft axially securing a roller bearing inner race of the output shaft bearing to the power output shaft, and
a seal ring sealingly engaging and disposed between the aft power shaft lock-nut and the high pressure lock-nut and operable to seal an annular gap between the power output shaft and the stub shaft.

12. The assembly as claimed in claim 11, further comprising:
the seal ring disposed in an annular ring groove extending radially inwardly into the aft power shaft lock-nut,
the seal ring operable to seal against the aft power shaft lock-nut within the annular ring groove,
the high pressure lock-nut including an annular cylindrical inner surface surrounding the annular ring groove, and
the annular cylindrical inner surface being operable to seal against the seal ring.

13. The assembly as claimed in claim 12, further comprising the seal ring being a carbon seal ring.

14. The assembly as claimed in claim 13, further comprising the carbon seal ring being split.

15. The assembly as claimed in claim 11, further comprising:
the seal ring disposed in an annular ring groove extending radially inwardly into the aft power shaft lock-nut,
the high pressure lock-nut including a forwardly extending annular arm having an annular cylindrical inner surface surrounding the annular ring groove, and
the annular cylindrical inner surface being operable to seal against the seal ring.

16. The assembly as claimed in claim 15, further comprising the seal ring being a carbon seal ring.

17. The assembly as claimed in claim 16, further comprising the carbon seal ring being split.

18. The assembly as claimed in claim 15, further comprising:
forward and aft retention tabbed rings engaging the aft power shaft lock-nut the high pressure lock-nut and the power output shaft and the stub shaft respectively,
forward and aft snap rings disposed in radially inwardly open annular forward and aft grooves in the aft power shaft lock-nut the high pressure lock-nut respectively, and
the forward and aft snap rings engaging the forward and aft retention tabbed rings and the high pressure lock-nut and the power output shaft and the stub shaft respectively.

19. The assembly as claimed in claim 18, further comprising the seal ring being a split carbon seal ring.

* * * * *